P. BRANNAN.
Corn-Plow.
No. 200,787. Patented Feb. 26, 1878.
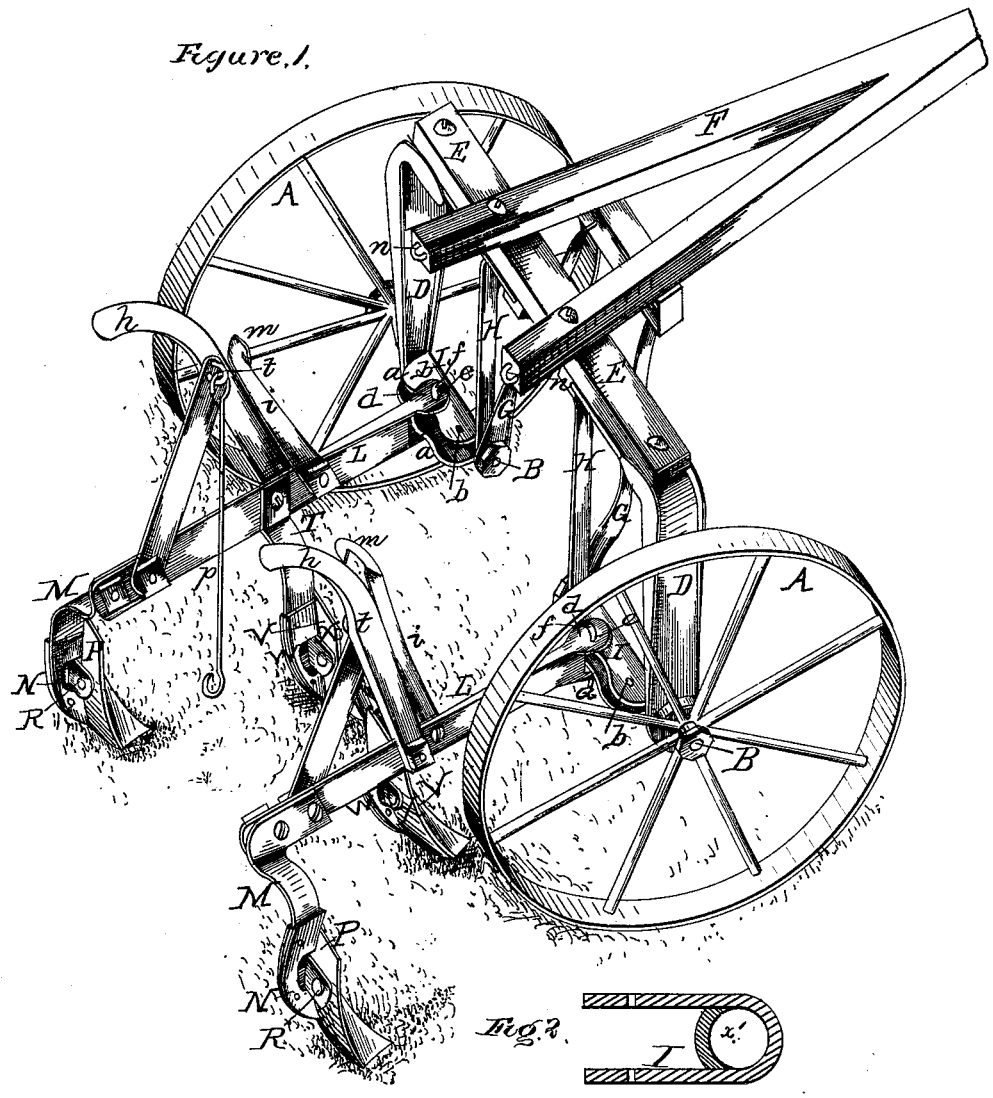
Witnesses
Chas. C. Gill
Jno. D. Patten
Inventor
Patrick Brannan
By his Attys.
Cox & Cox

UNITED STATES PATENT OFFICE.

PATRICK BRANNAN, OF FREEPORT, ILLINOIS.

IMPROVEMENT IN CORN-PLOWS.

Specification forming part of Letters Patent No. 200,787, dated February 26, 1878; application filed October 23, 1877.

*To all whom it may concern:*

Be it known that I, PATRICK BRANNAN, of Freeport, in the county of Stephenson and State of Illinois, have invented a new and useful Improvement in Corn-Plows, of which the following is a specification, reference being had to the accompanying drawings.

The invention relates to an improvement in corn-plows; and consists in an improved coupling for attaching plow or cultivator beams to the axle of a sulky or plow-carriage.

The object of the invention is to furnish an effective implement for agriculturists.

In the accompanying drawings, Figure 1 is a perspective view of a device embodying the elements of the invention. Fig. 2 is a cross-section of the sleeve I.

In the accompanying drawings, A represents the wheels of the implement, and B the axles upon which the wheels are mounted. The axles B are on the same horizontal plane, and extend toward the center of the device, though not entirely across it. Adjacent the wheels A the standards D are secured upon the axles B, and are connected at their upper ends by the bar E, upon which the forked tongue F is mounted. The bar E and tongue F are further secured by the braces G H, connected with the axles B at their inner ends.

Upon the axles B, between the standards D and braces G H, are loosely placed the sleeves I, having lips a, which extend rearward, and are supplied with the corresponding rows of apertures b, hereinafter mentioned.

The plow-beams L are furnished, on their front ends, with lips d, which fit over the lips a of the sleeves I, and are provided with apertures e, similar to the apertures b, which, in conjunction with the said apertures e, serve to receive the pins f, and thereby pivotally connect the plow-beam and sleeve. Thus it is manifest that by the rotation of the sleeves I on axles B, and by the pins or pivots f, the plow-beams L may have both a vertical and a horizontal oscillatory movement.

It is evident that by means of the rows of apertures b and apertures e the space between the beams L may be widened by simply adjusting the said beams further apart, or it can be lessened by bringing them toward each other.

The beams L are provided on their rear ends with the standards M, which curve outward and downward, and have their lower ends secured in the casings N, which are rigidly attached to the rear surface of the plowshares P by the lips R. At a suitable distance in front of these plowshares the beams L are also furnished with the standards T, which curve inward and downward, and are connected with the plowshares V by the casings W, having lips X, as shown, and in a manner similar to the junction of the standards M and shares P.

It is obvious that by having the standards M extending outward and the standards T inward, two rows may be furrowed by each beam at one operation.

The ordinary handles h are secured to the plow-beams L for the purpose of adjusting them.

About the center of the beams L are pivoted the lower ends of the hangers i, the upper ends thereof being free and bent inward, so as to form the hooks m, which, when it is desired to retain the plow-beams in an elevated position, so that their shares will not touch the ground, are placed in the eyes n, secured in the rear ends of the forked tongue F. Thus, in passing over a road, the plowshares may be thus elevated; but when the field is entered the hooks m are detached from the eyes n, so that the shares may reach the ground.

It is obvious that any suitable means may be employed for holding the plow-beams in a fixed position. At present, however, the hooks p and eyes t are supplied for that purpose.

I claim as my invention and desire to secure by Letters Patent—

The plow-beams L, provided upon the upper and lower surfaces of their front ends with the lips d, having apertures e, in combination with the cylindrical sleeve I, provided with scalloped lips a, projecting rearward from the top and bottom of said sleeve, and having apertures b, thus protecting the axles B, and affording a free lateral movement of the plow-beams, substantially as shown and set forth.

In testimony that I claim the foregoing improvement in corn-plows, as above described, I have hereunto set my hand.

PATRICK BRANNAN.

Witnesses:
GEO. WOLF,
E. ORDWAY.